(12) United States Patent
Harper et al.

(10) Patent No.: US 7,376,395 B2
(45) Date of Patent: May 20, 2008

(54) CONTROLLING A TELECOMMUNICATIONS DEVICE

(75) Inventors: Richard Harper, Cambridge (GB); Julian Gebhardt, Erfurt (DE); Stephen E. Hodges, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 293 days.

(21) Appl. No.: 11/172,271

(22) Filed: Jun. 30, 2005

(65) Prior Publication Data

US 2007/0004341 A1 Jan. 4, 2007

(51) Int. Cl.
*H04B 17/00* (2006.01)

(52) U.S. Cl. .............. 455/67.7; 455/567; 455/412.2; 455/414.1; 455/417; 455/415; 379/142.06; 379/373.03; 379/373.01; 379/252

(58) Field of Classification Search .......... 455/67.7, 455/417, 415, 412.2, 567; 379/373.04, 142.06, 379/252
See application file for complete search history.

(56) References Cited

U.S. PATENT DOCUMENTS

| | | | | |
|---|---|---|---|---|
| 5,659,604 A * | 8/1997 | Beckmann | ............... | 379/32.01 |
| 6,574,470 B1 * | 6/2003 | Chow et al. | ................ | 455/417 |
| 6,836,651 B2 * | 12/2004 | Segal et al. | ................ | 455/405 |
| 6,859,722 B2 * | 2/2005 | Jones | ......................... | 701/200 |
| 6,993,363 B1 * | 1/2006 | Hsu | .......................... | 455/567 |
| 7,072,569 B2 * | 7/2006 | Lakhansingh | ............... | 386/46 |
| 7,088,816 B2 * | 8/2006 | Donnelly | ............... | 379/373.01 |
| 7,096,009 B2 * | 8/2006 | Mousseau et al. | .......... | 455/415 |
| 7,113,586 B2 * | 9/2006 | Silver | .................... | 379/376.02 |
| 7,142,846 B1 * | 11/2006 | Henderson | .................. | 455/417 |
| 7,200,420 B2 * | 4/2007 | Rankin | ....................... | 455/558 |
| 7,203,479 B2 * | 4/2007 | Deeds | ........................ | 455/407 |
| 7,239,693 B2 * | 7/2007 | Silver | .................... | 379/373.03 |
| 7,257,221 B2 * | 8/2007 | Shibao | .................. | 379/373.04 |
| 7,283,829 B2 * | 10/2007 | Christenson et al. | ....... | 455/461 |

\* cited by examiner

*Primary Examiner*—Marceau Milord

(57) ABSTRACT

A telecommunications device comprises a communication alert system arranged to inform the user that a telecommunications signal has been received. The communication alert system uses one of a number of different indicators. The controller is arranged to control the selection of the one of a plurality of indicators such that the selection is affected by a user selectable component of the received telecommunications signal.

19 Claims, 5 Drawing Sheets

CONTROLLING A TELECOMMUNICATIONS DEVICE

BACKGROUND

The present invention relates to the control of a telecommunications device and to apparatus therefor.

Human communication is an extremely complex process in which a variety of different factors influence success or failure. In conversation, for example, it is not only the specific words chosen by the contributors which affect the outcome; it is also tone of voice, facial expression and body language, and even 'ritual rights to address another' that might matter. Each, in varying degrees, greatly influence the receptiveness of each participant; each may even affect an individual's willingness to participate in conversation in the first place. In short, conversations are not easily commenced or ended nor are they merely about the exchange of words: tone, facial expressions, body language, rules related to who can talk to whom about what and when, as well as much else beside, all can be crucial from the initial salutation through to the farewell.

If this holds true for face to face conversation, then it is equally important with remote communications, such as enabled through voice or video telephony. Unfortunately, users of such technologies are at a particular disadvantage. They are provided with few, if any, methods for conveying some of the visual, auditory and bodily signals that define intended tone, for example. Moreover, though some of the social proprieties relating to 'who can call who' are facilitated by such things as caller line identification, this is not always available and, in any case, these proprieties are often undermined by lack of information about tone. This is a particularly noticeable deficiency at the start of a call when the person initiating the communication has no way of presenting themselves and setting the tone until the conversation is underway. This why so many telephone calls start with discussion of who is making the call, why it is being made, the frame of mind of the caller and so forth, all of which are in effect conversational topics acting as surrogates for other, non-verbal ways of communicating tone and deploying rights of contact.

For instance, when some one calls on a mobile phone, the ring tone and other properties of the receiving device actuated by the receipt of the call remain solely in the control of the owner of the receiving device. Hence a caller can not affect how they are presented to the person receiving the call: they cannot convey, through the ring tone, for example, urgency or anger, friendliness or confusion: all these tones are subsumed under one ring tone. Nor can they ensure that the recipient knows who is calling, unless that recipient has correctly entered a name in their mobile phone's address book associated with the caller line number. Hence, what is in effect a human summons of many different hues is transformed by mobile telecommunications technology into a single hue provided with one anonymous 'face' consisting of a ring tone and a telephone number. This makes mobile telecommunication, either voice or video, very unlike normal communication between people face to face. In a phrase, the one allows expression before words are spoken, the other does not.

The consequence is that though the technology might have been designed with the hope of bringing people closer together, in practice that very technology pulls them apart by diminishing what people can communicate. This was not the intention of those who designed the technology, of course. Nevertheless, in order to improve the ease and value of the technology, and so of remote communications, there is a need to enable the richness of expression and meaning described above, as there is too a need to associate this with social systems of propriety. Doing so will be of benefit at all stages of a communication, from commencement through to termination.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In accordance with one aspect of the present invention there is provided a telecommunications device comprising a communication alert system arranged to inform the user that a telecommunications signal has been received from a specific originating device, by the use of one of a plurality of indicators. Each indicator is a sensory indication detectable by the user of the device, including an audible, visual or vibratory indication. A controller is arranged to detect a user selectable component of said telecommunications signal and to control the selection of one of a number of indicators based on the user selectable component of the received telecommunications signal;

Preferably the controller is coupled to an address book within which are listed a user's selection of originating devices from which a telecommunications signal may be generated, the controller being adapted such that in order to affect the selection of the of a plurality of indicators the telecommunications signal must be received from an originating device listed in the address book.

Most preferably, the originating devices listed within the address book are categorized into two or more authorization levels, the controller being adapted such that the affect on the device which the telecommunications signal can have is a function of the authorization level to which the originating device belongs.

A device may be arranged to act as both a receiving device and an originating device. In this case the device comprises selection means for selecting a specific indicator or group of indicators within another receiving device.

In accordance with another aspect of the present invention there is provided a method of indicating the receipt of a telecommunications signal from a specific originating device at a receiving device. The receiving device comprises a communication alert system arranged to inform the user that a telecommunications signal has been received from a specific originating device, by the use of one of a plurality of indicators. A controller is arranged to control the selection of the one of a plurality of indicators such that the selection is affected by a user selectable component of the received telecommunications signal.

The method includes the steps of seeding control of one or more aspects of the operation of the receiving device to the originating device and selecting one of the plurality of indicators for use, based on a user selectable component of the received telecommunications signal.

In accordance with yet another aspect of the present invention there is provided a telecommunications network, which is accessibly by, at least, an originating device and a receiving device. Each device comprises a communication alert system arranged to inform the user that a telecommunications signal has been received from a specific originating device, by the use of one of a plurality of indicators. A controller is arranged to control the selection of the one of a plurality of indicators such that the selection is affected by a user selectable component of the received telecommunications signal. The network comprises means for transmitting the telecommunications signals from the originating device to the receiving device, thus enabling the selection of one of the indicators for use in the receiving device to be affected by the received signal from the originating device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the specification the term telecommunications device is intended to include any device suitable for remote telecommunications over a telecommunications network utilizing the transmission of a signal, including but not limited to a mobile or landline telephone; a computer equipped for voice over IP communications; a PDA, a pager, or a radio frequency communications device.

Therefore, although for convenience some embodiments of the present invention have been described in terms of mobile phones the invention is in no way limited to mobile phones.

Figure 1:
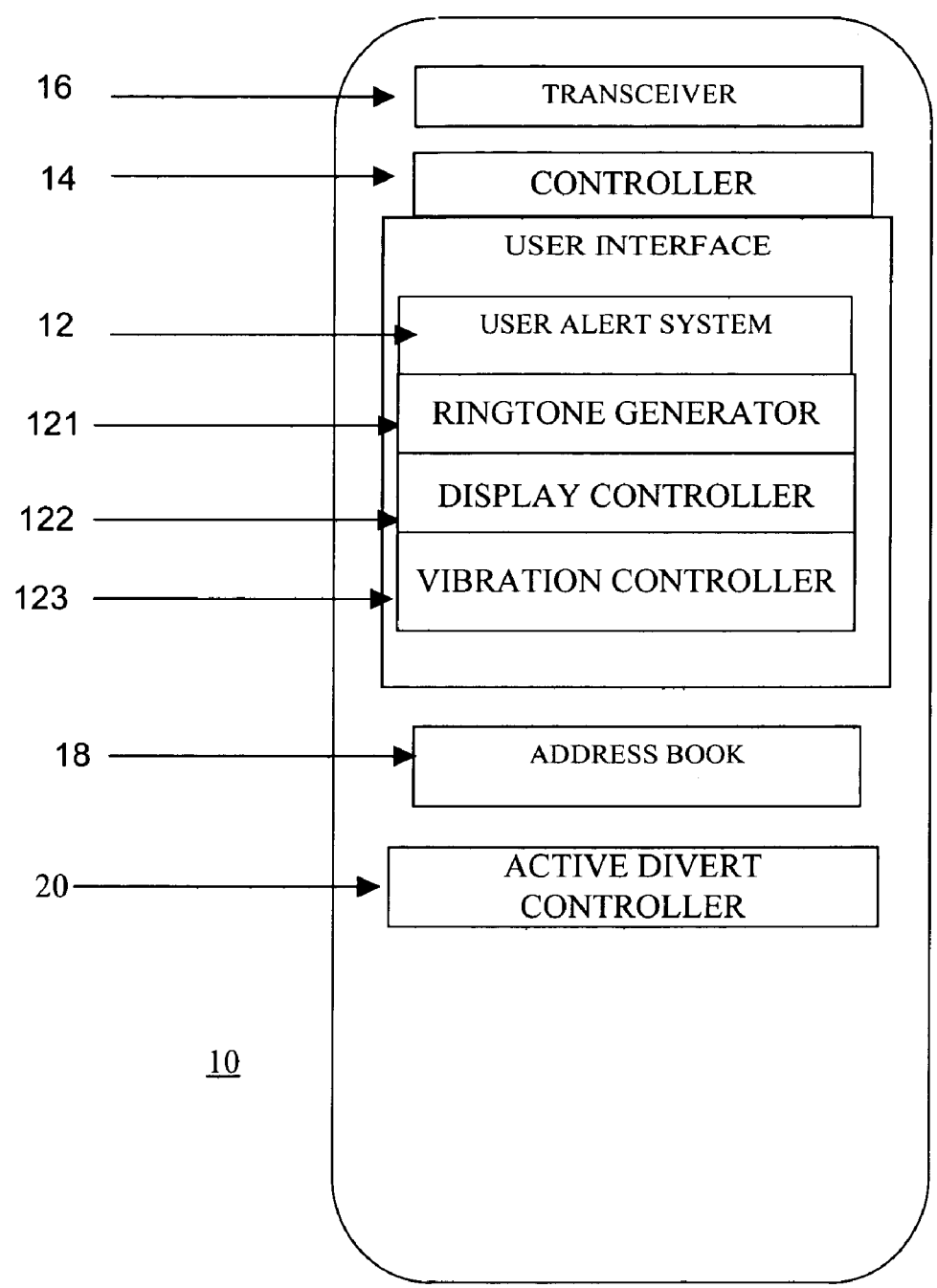
FIG. 1 is a schematic representation of the interior of a telecommunications device, in the form of a mobile phone, in accordance with the present invention.

FIG. 1 illustrates a telecommunications device in the form of a mobile phone 10.

The mobile phone 10 includes a communication alert system 12 arranged to inform the user thereof that a telecommunications signal has been received from a specific originating device (101, FIG. 3), by the use of one of a plurality of indicators. Each indicator is a sensory indication detectable by the user of the receiving device (102, FIG. 3), including an audible, visual or vibratory indication. Indicators which are commonly used in, for example, mobile phones at present include: ring tones, produced by a ring tone generator 121; visual indicators from mere caller identification to avatars and other pop ups, produced by a display controller 122; and vibratory indication produced by a vibration controllers 23.

Other forms of indicator are also possible. For example, voice files are exchangeable between telecommunications devices, especially computers (103, FIG. 3), for example utilizing voice over IP protocols. However, there is no technical reason why these files can not be transferred between other telecommunications devices, such as 3G mobile phones. Therefore, a voice file, either recorded by the user of the receiving phone (102, FIG. 3) or the originating phone (101, FIG. 3) can be used as an audible indicator of the receipt of a telecommunications signal. Alternatively, the user's verbal salutation, intended for use as an indicator, may be recreated at the receiving phone by the use of artificial voice simulation techniques.

As this form of indication may be used to impart all the information the user of the originating device 101 wishes to impart it may result in a reduction in telecommunications traffic. However, in order to maintain service provider revenues it may be necessary to charge for this service. Charges on a par with those for SMS messaging may well be appropriate.

In one embodiment the indicators are arranged into groups with specific defining characteristics. The defining characteristics may be chosen in whatever way a user decides. For example, different groups may be indicative of: different emotional states, from angry to happy; different degrees of urgency from low to high; different levels of privacy from open to confidential; or different classifications of caller from professional colleague to personal friend or spouse. Clearly, a group can include a selection of different indicators, be they visual, audio or vibratory indicators, as long as they conform to the characteristics of the group.

In the mobile phone of FIG. 1 a controller 14 is arranged to control the selection of said one of a plurality of indicators such that the selection is affected by the telecommunications signal received by the transceiver 16. How this control is implemented will be discussed in more detail below.

The mobile phone of FIG. 1 further comprises an address book 18 within which a user can list their own selections of useful telephone numbers associated with originating devices which they wish to call on a reasonably regular basis. It is reasonable to expect the user of a mobile phone to receive incoming calls from the devices listed in their address books. Accordingly, in one preferred embodiment of the present invention the controller 14 is adapted such that in order to affect the selection of said one of a plurality of indicators the telecommunications signal must be received from an originating device listed in the user's address book 18.

However, it is also reasonable to expect that the user will have very different relationships with each of the people who's telephone numbers are listed in his address book 18, from family and close friends, through work colleagues to relative strangers, such as workmen. Accordingly, in another embodiment the originating devices (101, FIG. 3) listed within the address book 18 are categorized into two or more authorization levels. Furthermore, the controller 14 is adapted such that the affect an incoming call has on the user's phone (102, FIG. 3) is a function of the authorization level to which the originating phone (101, FIG. 3) belongs.

Four authorization levels would suffice for most purposes, although others may be added if a user wishes to provide more specific demarcation of functions to different incoming calls. If a user decides that they will not allow all individuals within their address book 18 to avail themselves of this function then a first authorization level would list those numbers from which a received signal would have no effect on the receiving device. A second level would indicate that incoming calls can affect the selection of an indicator from those listed in the user alert system 12 of the receiving device.

A third authorization level would indicate that a caller is also allowed to transmit an indicator for use at the receiving device 102. This would result in the need to ensure that the receiving device 102 is licensed to use the transmitted indicator. In order to ensure that this is the case, the first step would be for the receiving device 102, on receipt of an incoming signal including an indicator signal, to search the indicators stored within the device 102. If the device already has the indicator then it would use that version. If it did not already have the desired indicator stored therein then it would save the received version to the user alert system 12, within, for example the ring tone generator 121. In addition, the device 102 would retransmit a signal to the originating device 101 informing it that a fee is payable if the received indicator is to be maintained and used by the receiving device 102. The originating device 101 would then retransmit a second signal agreeing to pay a license fee, and would also send a signal, at that time or later to their service provider in response to which a one-off license fee would be added to their monthly invoice.

Finally, a fourth authorization level would indicate that the incoming signal was not only allowed to affect the user alert system 12, but also to affect other systems within the receiving device. For example, the controller 14 can be arranged to allow an incoming signal to control the active diverts, through a divert controller 20, thus preventing the device from diverting the telecommunications signal to voice mail. This would allow a caller with an extremely important or urgent call or SMS message to persistently present that to the user of the receiving device 102 until it is acknowledged, as their normal diverts can not switch the call to voicemail or other storage.

The fact that a user's mobile phone 102 in particular may receive a signal resulting in the production of an unexpectedly loud and/or persistent alert signal will inevitably make people think about how they use their mobile phones. They will be required to think more closely about when and where they chose to leave their phones switched on. It will also make them consider whom they include in their address book, or at least, what level of authorization they allocate.

Figure 2:
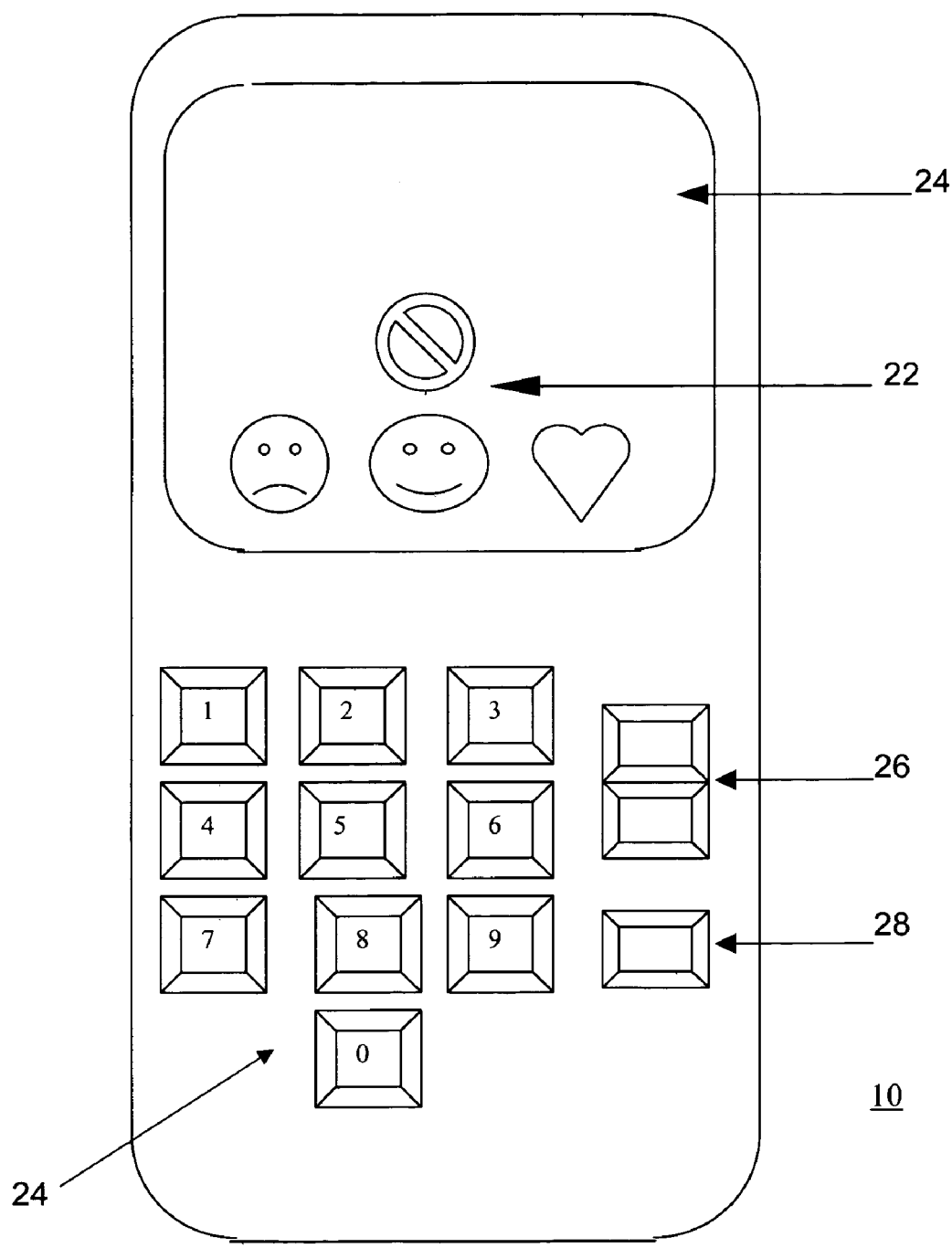
FIG. 2 is a schematic representation of the exterior user interface of the mobile phone of FIG. 1.

FIG. 2 illustrates a mobile phone 10 arranged to act as both a receiving device 102 and an originating device 101. The phone 10 comprises selection means for selecting a specific indicator or group of indicators. The selection means is a user interface including an array of icons 22, each of which indicates either a group or a specific indicator, as detailed above and a scroll key 26 and a select key 28.

The phone 10 further includes a normal keypad 24. The scroll key 26 can be used to scroll through the available icons, relating to indicators or groups, and the select key can be used to select the desired one of said icons 22. Clearly, in other embodiments other user interface means would be equally applicable. For example, if the device 10 had a touch screen the desired indicator or group could be selected by touching the appropriate icon. This embodiment is particularly useful when used in association with the method described below, with reference to FIG. 5.

Figure 3:
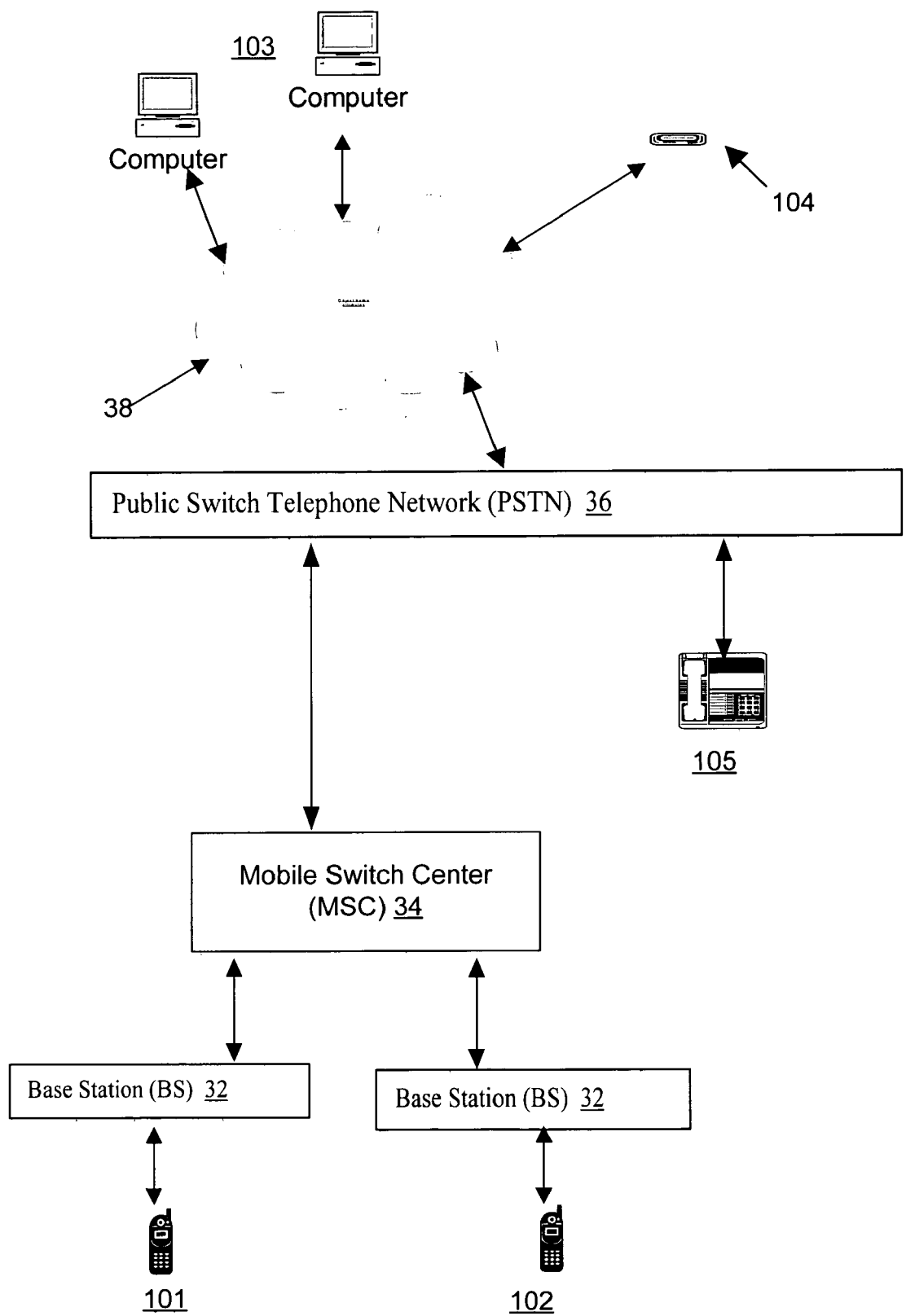
FIG. 3 is a schematic representation of a telecommunications network in accordance with another aspect of the present invention.

FIG. 3 illustrates a telecommunications network 30 that is accessible by, at least, an originating device 101 and a receiving device 102. Each device comprises a user alert system as described above. The network comprises means for transmitting the telecommunications signals from the originating device to the receiving device. For example, in the case of communication between an originating mobile device 102 and a receiving mobile device 101 the network includes a base station (BS) 32 for the clusters containing each of the devices 101, 102 as well as the mobile switch center (MSC) 34 and the public switch telephone network (PSTN) 36. In the case of a voice over IP signal from one computer 103 to another or to a PDA or Blackberry™ 104 the network would include an IP network, such as the Internet 38.

In this way any of the telecommunications devices illustrated in FIG. 3, including the landline telephone 105, can be utilized in a network in accordance with the present invention. The networks in turn allow the transmission of signals between the devices, which enables the selection of one of the indicators for use in the receiving device 102 to be affected by the received signal from the originating device 101.

Before a user of an originating device 101 can affect the systems of a receiving device 102 the user thereof must authorize the originating device 101. This can be done in a number of ways. For example, when the user of the receiving device 102 in accordance with one embodiment enters a record of the originating device 101, and its owner, into their address book 18 the user also authorizes that originating device 101 to be able to affect the receiving device 102. This is done through a simple user interface, for example, by ticking a box for "authorization". In more advanced versions the user can also indicate the level of authorization, as described above, using the same user interface.

Figure 4:
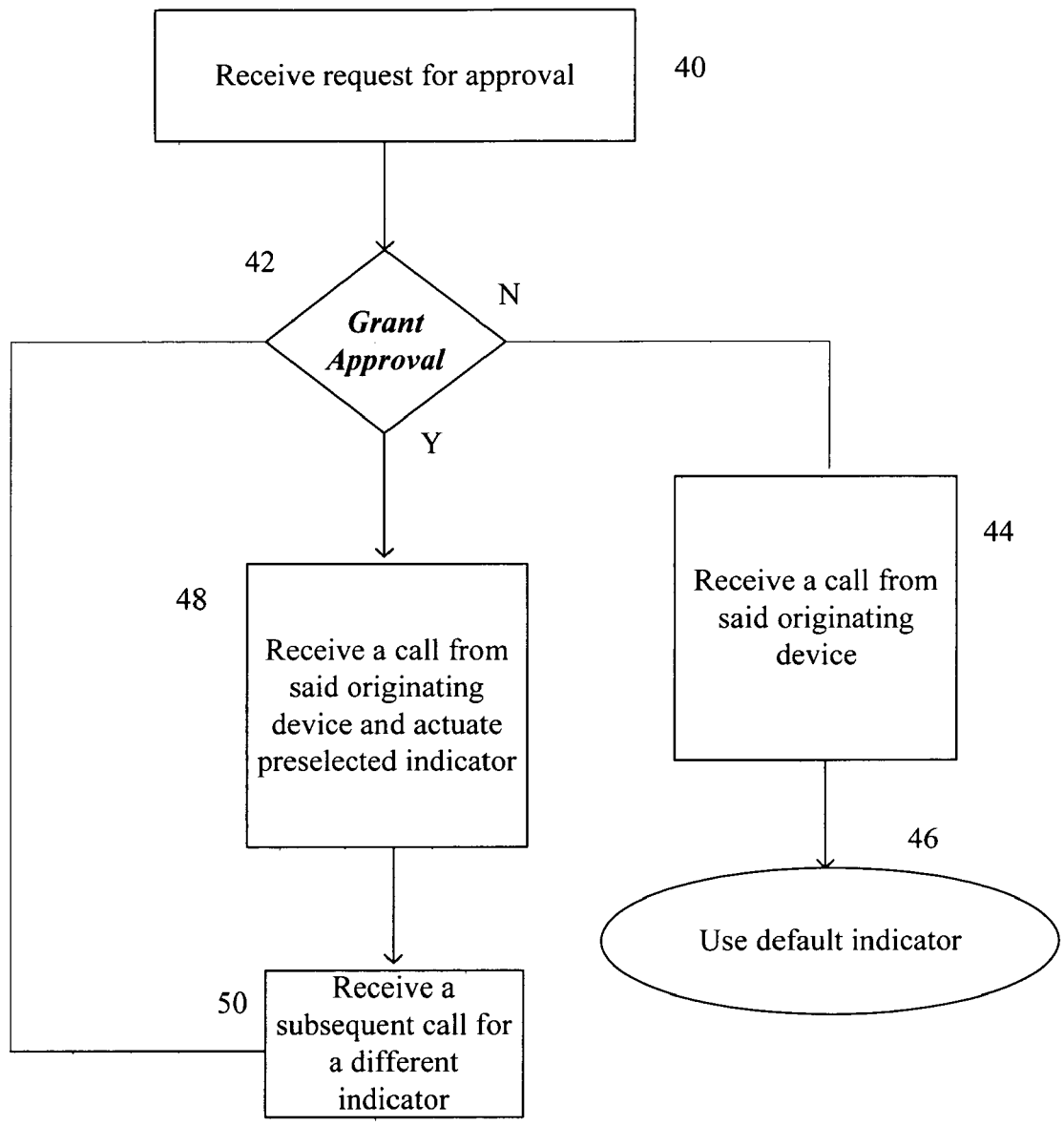
FIG. 4 is a flowchart depicting a first method of alerting a user of a telecommunications device to an incoming signal, in accordance with yet another aspect of the present invention.

Alternatively, a user of an originating device 101 who wishes to affect the receiving device 102 can request authorization by first sending the receiving device 102 a request to access, as illustrated in FIG. 4. It is particularly convenient if this request for authorization is accompanied by useful information regarding the user of the device from which the request is sent. Thus in step 40, the request for authorization is embodied in an enhanced vCard™ format, provided by the Internet Mail Consortium, and commonly known as an electronic business card. In step 42, the user of the receiving device 102 either grants or denies approval when accepting the vCard. As before the user can again enter a level of authorization for each accepted vCard. If the user of the receiving device 102 denies authorization, either by choosing not to save the vCard to his or her address book 18 or by entering a zero authorization rating then the receiving device 102, on receipt of a call from the originating device 101, step 44, will always use the default indicator, step 46. However, should a user of the receiving device 102 accept a vCard and authorizes the originating device 101 the user of the originating device can place one or more calls or send one or more SMS message to the receiving device 102 and his or her choice of indicator will be selected by the user alert system 12 of the receiving device 102, step 58. However if the user of the originating device 101 wishes to change the indicator selected at the receiving device 102 he or she has to send a subsequent vCard prior to placing another call or the like, step 50. This request will then be passed through the same authorization process as before, see step 42.

As stated above, this embodiment would require a minor amendment to the vCard format. However, it would not require any significant change of the major telecommunications standards, such as the GSM mobile phone standard.

Figure 5:
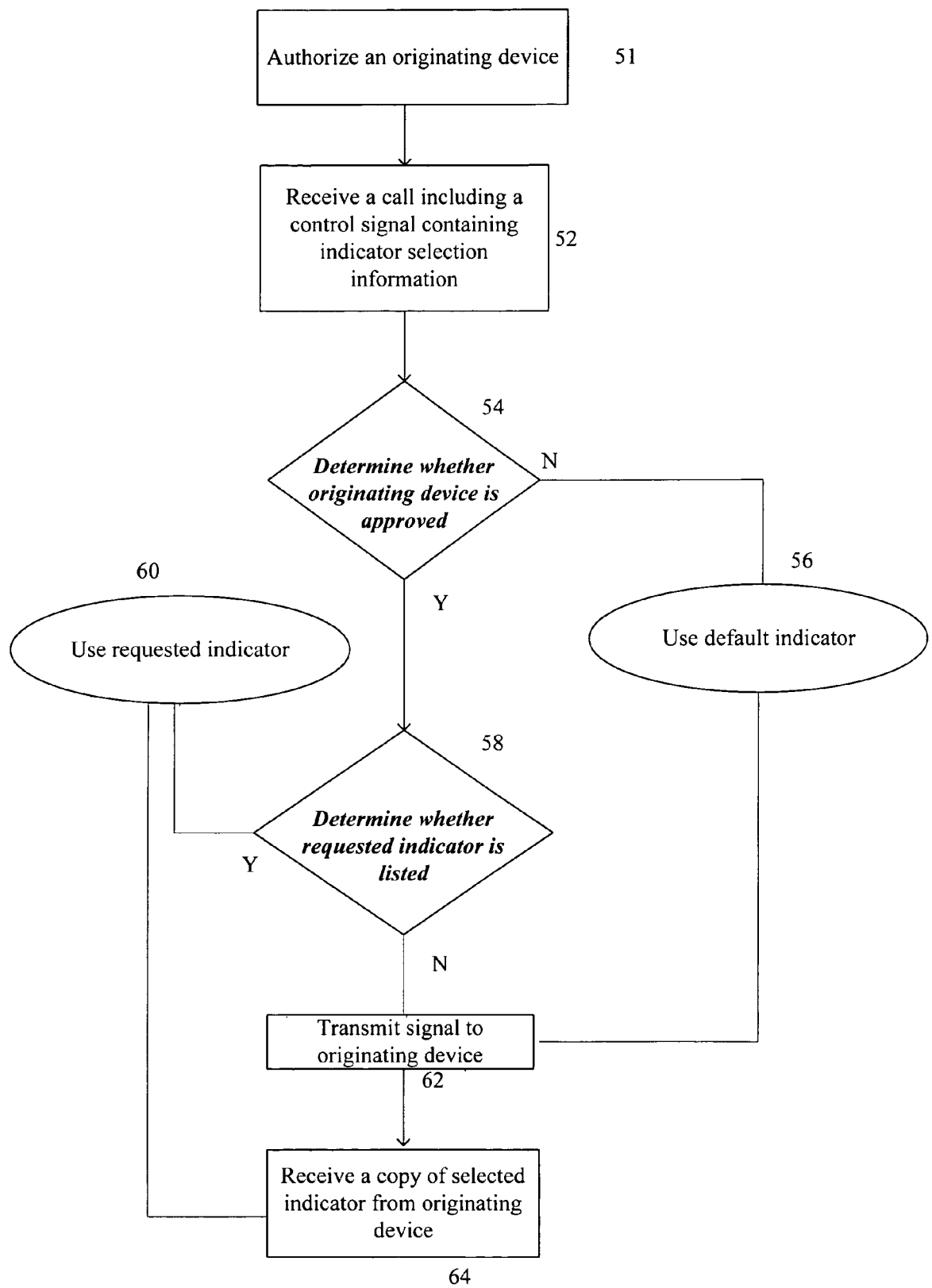
FIG. 5 is a flowchart depicting a second method of alerting a user of a telecommunications device to an incoming signal, in accordance with yet another aspect of the present invention Like reference numerals are used to designate like parts in the accompanying drawings.

FIG. 5 illustrates another method of authorizing the service and sending indicator choices. In this embodiment the step of authorizing an originating device 101, step 51, can be achieved either using a vCard or the like or simply on entry of the device into the address book 18 of the receiving device 102, as described above. However, in this embodiment the originating device transmits not only the information signal containing the call or SMS message or the like, it also transmits a control signal containing information regarding the desired indicator to be used at the receiving device 102, step 52. On receipt of this combined signal the controller 14 determines whether or not the originating device 101 is listed in the address book 18, and checks the authorization level listed for the originating device 101, step 54. If the originating device 101 is not listed or does not have appropriate authorization the receiving device 102 will use a default indicator to alert the user to the call, step 56. However, if the originating device 101 is listed, and has an authorization level that permits selection of an indicator, the controller 14 then determines whether the receiving device 102 has the desired indicator in store, step 58. If the indicator is stored then the receiving device 102 will actuate that indicator, step 60, and thus alert the user to the received signal.

However, if the receiving device 102 does not have the desired indicator in store it will transmit a signal back to the originating device 101 informing it of this situation, step 62. On receipt of this return signal the originating device 101 will either transmit a signal requesting the receiving device 102 use its default indicator, as in step 56 or it will transmit a copy of the required indicator to the receiving device 102, step 64, assuming this would not be so time consuming as to be unacceptable to the user of the originating device 101. Of course, this action may result in licensing issues, as mentioned above, and the originating device 101 may be charged for the transmission of the indicator. This is achievable with real-time invoicing systems that are presently available, for example, from mobile phone service providers. Thereafter, the controller 14 at the receiving device 102 will actuate the desired indicator to alert the user to the incoming signal, step 60. This one step method provides greater flexibility than the method of FIG. 4, as a different indicator can be selected each time a user of an originating device 101 makes a call.

Clearly, in order for this embodiment to be implemented will require a more significant change to certain telecommunications standards than other embodiments. For example, the GSM mobile phone standard will not require amendment for the enhanced vCard approach, but would require amendment with the one stage approach in which networks have to handle control signals along with standard information signals.

Although the above embodiment has been described in terms of mobile phones as stated above any telecommunications devices can be utilized in accordance with the present invention.

From the above description of the invention, those skilled in the art to which the present invention relates will perceive improvements, changes and modifications. Numerous substitutions and modifications can be undertaken without departing from the true spirit and scope of the invention. For example, it may be desirable for receiving devices 102 to be equipped with a default switch, which switches off this service for a period of time determined by the user. Such improvements, changes and modifications within the skill of the art to which the present invention relates are intended to be covered by the appended claims.

The invention claimed is:

1. A telecommunications device comprising:
    a communication alert system arranged to indicate the receipt of a telecommunications signal from a specific originating device, by the use of one of a plurality of indicators; and
    a controller arranged to detect a user selectable component of a telecommunications signal from said originating device and to control the selection of said one of a plurality of indicators based on said user selectable components,
    wherein the controller is coupled to an address book within which are listed a user's selection of originating devices from which a telecommunications signal may be generated,
    wherein said originating devices listed within the address book are categorized into two or more authorization levels,
    the controller being adapted such that the affect on said device which said telecommunications signal can have is a function of the authorization level to which the originating device belongs.

2. The device as claimed in claim 1, wherein each indicator is a sensory indication detectable by the user of the device, including an audible, visual or vibratory indication.

3. The device as claimed in claim 1, wherein
    the controller being adapted such that in order to affect the selection of said one of a plurality of indicators the telecommunications signal must be received from an originating device listed in said address book.

4. The device as claimed in claim 1, wherein the indicators are arranged in groups with specific defining characteristics.

5. The device as claimed in claim 4, wherein said defining characteristics are indicative of:
    different emotional states, from angry to happy;
    different degrees of urgency;
    different levels of privacy from open to confidential; or
    different classifications of caller from professional colleague to personal friend.

6. The device as claimed in claim 1, arranged to act as both a receiving device and an originating device, the device comprising:
    selection means for selecting a specific indicator or group of indicators.

7. The device as claimed in claim 6, wherein the controller is arranged, after receipt of a first user selectable component, to select a specific indicator or an indicator from a specific group each time a telecommunications signal is received from said specific originating device, until a new user selectable component is received from that originating device.

8. The device as claimed in claim 6, arranged to receive a user selectable component from an originating device with each telecommunications signal;
    the controller being arranged to select a specific indicator or an indicator from a specific group only once in response to said received user selectable component.

9. The device as claimed in claim 6, wherein said selection means is as an array of icons each of which indicates either a group or a specific indicator.

10. The device as claimed in claim 6, wherein the indicator is a voice message recorded by the user of the originating device, which is transmissible to the receiving device as a voice file in addition to the telecommunications signal.

11. The device as claimed in claim 1, wherein the controller controls both the selection of the indication means and other systems within the device in response to said telecommunication signal from the originating device.

12. The device as claimed in claim 11, wherein said other systems include the active diverts for the device, thus preventing the device from diverting the telecommunications signal to voice mail.

13. A method of indicating the receipt of a telecommunications signal from a specific originating device at a receiving device, the method comprising:
seeding control of one or more aspects of the operation of the receiving device to the originating device, wherein the receiving device via a communication alert system indicates the receipt of a telecommunications signal from a specific originating device by the use of one of a plurality of indicators, and the receiving device via a controller detects a user selectable component of a telecommunications signal from said originating device and controls the selection of said one of a plurality of indicators based on said user selectable component,
wherein the controller is coupled to an address book within which are listed a user's selection of originating devices from which a telecommunications signal may be generated,
wherein said originating devices listed within the address book are categorized into two or more authorization levels,
the controller being adapted such that the affect on said device which said telecommunications signal can have is a function of the authorization level to which the originating device belongs; and
selecting one of said plurality of indicators for use, based on a user selectable component of the received telecommunications signal.

14. The method as claimed in claim 13, wherein the setting of the controller to select a specific indicator or an indicator from a specific group is arranged once;
wherein upon receipt of each subsequent telecommunications signal the controller selects said specific indicator or an indicator from said specific group.

15. The method as claimed in claim 13, wherein the setting of the controller is a one step process;
the information on which the controller selects a specific indicator or group being transmitted at the same time as the telecommunications signal to which the user is to be alerted.

16. The method as claimed in claim 15, wherein the controller is set during the handshaking process through which a telecommunications link between two devices is arranged.

17. The method as claimed in claim 13, wherein
the controller being arranged to:
allow telecommunication signals from originating devices in a first authorization level to affect the selection of an indicator;
allow telecommunication signals from originating devices in a second authorization level to transmit an indicator to the receiving device; and
allow telecommunication signals from originating devices in a third authorization level to affect other systems within the receiving device.

18. A method of indicating the receipt of a telecommunications signal from a specific originating device at a receiving device, the method comprising:
seeding control of one or more aspects of the operation of the receiving device to the originating device, wherein the receiving device via a communication alert system indicates the receipt of a telecommunications signal from a specific originating device by the use of one of a plurality of indicators, and the receiving device via a controller detects a user selectable component of a telecommunications signal from said originating device and controls the selection of said one of a plurality of indicators based on said user selectable component; and
selecting one of said plurality of indicators for use, based on a user selectable component of the received telecommunications signal,
wherein the receiving device receives:
a first telecommunications signal including a user selectable component in the form of an enhanced "V" card, including information indicative of the desired selection of a specific indicator or indicator group; and
a second telecommunication signal in response to which the controller selects an indicator based upon the information within said user selectable component of the received telecommunications signal.

19. A telecommunications network which is accessible by, at least, an originating device and a receiving device, each device comprising:
a communication alert system arranged to indicate the receipt of a telecommunications signal from a specific originating device, by the use of one of a plurality of indicators; and
a controller arranged to detect a user selectable component of said telecommunications signal and to control the selection of said one of a plurality of indicators based on said user selectable component of the received telecommunications signal,
wherein the controller is coupled to an address book within which are listed a user's selection of originating devices from which a telecommunications signal may be generated,
wherein said originating devices listed within the address book are categorized into two or more authorization levels,
the controller being adapted such that the affect on said device which said telecommunications signal can have is a function of the authorization level to which the originating device belongs; and
the network comprising means for transmitting said telecommunications signals from the originating device to the receiving device, thus enabling the selection of one of said indicators for use in the receiving device to be affected by the user selectable component of said received signal from the originating device.

* * * * *

UNITED STATES PATENT AND TRADEMARK OFFICE
CERTIFICATE OF CORRECTION

| | | |
|---|---|---|
| PATENT NO. | : 7,376,395 B2 | Page 1 of 1 |
| APPLICATION NO. | : 11/172271 | |
| DATED | : May 20, 2008 | |
| INVENTOR(S) | : Richard Harper et al. | |

It is certified that error appears in the above-identified patent and that said Letters Patent is hereby corrected as shown below:

In column 8, line 19, in Claim 1, delete "components," and insert -- component, --, therefor.

Signed and Sealed this

Third Day of May, 2011

David J. Kappos
*Director of the United States Patent and Trademark Office*